Feb. 4, 1936.                H. D. GEYER                2,029,367
                       COMPOSITE RUBBER PISTON
                        Filed Aug. 3, 1934

INVENTOR
Harvey D. Geyer
BY
Spencer Hardman & John
ATTORNEYS

Patented Feb. 4, 1936

2,029,367

UNITED STATES PATENT OFFICE 2,029,367

COMPOSITE RUBBER PISTON

Harvey D. Geyer, Dayton, Ohio, assignor to General Motors Corporation, Detroit, Mich., a corporation of Delaware Application August 3, 1934, Serial No. 738,178

5 Claims. (Cl. 103—225)

This invention relates to pistons, especially designed for hydraulic cylinders such as are used in hydraulic brake systems for automotive vehicles.

An object of the invention is to provide an improved form of piston for hydraulic cylinders which is highly efficient and has a long life in use and yet is very simple and economical to manufacture.

A more specific object is to provide an integrally molded composite piston of hard and flexible rubber, the hard rubber portion forming the bearing which slides upon the cylinder walls while the flexible rubber portion forms the piston head which permits fluid to flow past same in one direction of movement but seals the fluid flow in the other direction of movement.

Further objects and advantages of the present invention will be apparent from the following description, reference being had to the accompanying drawing, wherein a preferred embodiment of the present invention is clearly shown.

In the drawing.

Similar reference characters refer to similar parts throughout the several views.

Figure 2:
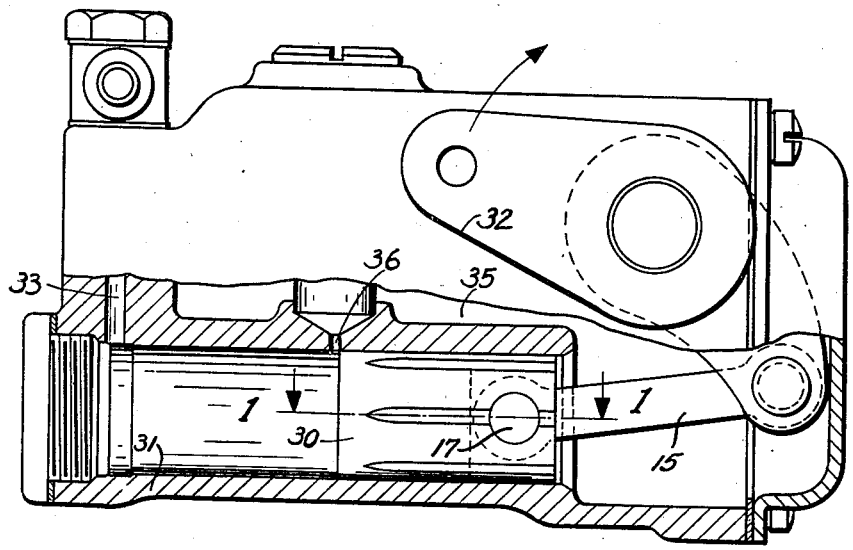
Fig. 2 shows the piston of Fig. 1 in side elevation in the master cylinder of a hydraulic braking system for automobiles.

The piston 30 of this invention reciprocates within the master cylinder 31. To apply the brakes in the device illustrated in Fig. 2, piston 30 is forced to the left (as viewed in Fig. 2) by any suitable mechanical linkage such as the rocking lever 32 and the connecting rod 15. The working fluid, such as oil, is forced by piston 30 from cylinder 31 through the duct 33 and thence to the brake-actuating fluid motors and thus the brakes are applied. When it is desired to release the brakes, piston 30 is returned to its position shown in Fig. 2 and the working fluid which was forced out of cylinder 31 through duct 33 returns thereto through the same duct 33 due to the reduction of pressure. The chamber 35 overlying cylinder 31 and communicating with the back of piston 30 is a working fluid reservoir which keeps the cylinder 31 filled with working fluid at all times. Any fluid which escapes past piston 30 during its compression or working stroke enters this reservoir 35, and when piston 30 is on its return stroke this escaped fluid returns to cylinder 31 past the flexible cup 12 of the piston as described hereinafter. Reservoir 35 communicates with the cylinder 31 through the passage 36 when piston 30 is in its fully withdrawn position in order to insure that cylinder 31 is maintained completely filled with the working fluid at all times.

Figure 1:
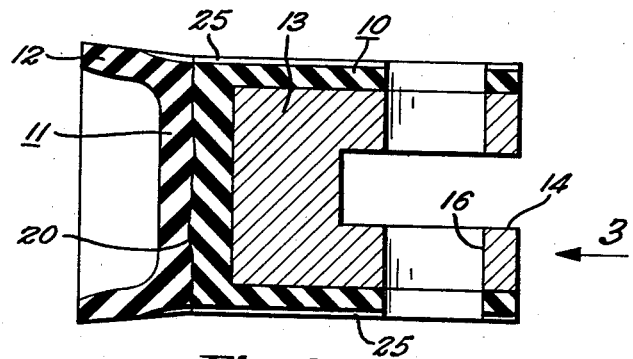
Fig. 1 is a longitudinal section through the piston made according to this invention and is taken on line 1—1 of Fig. 2.
Figure 3:
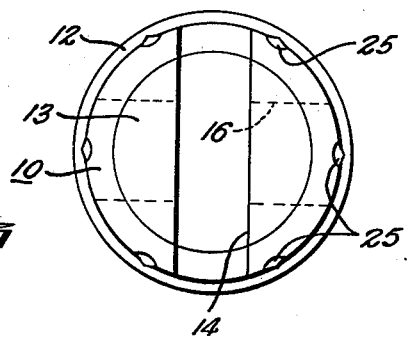
Fig. 3 is a pivot end elevation of the piston looking in the direction of arrow 3 of Fig. 1.

The piston shown in Fig. 1 comprises a hard rubber body 10 integrally molded with a flexible rubber piston head 11 having an integral expansible circular flange 12 thereon. The rubber piston body 10 has a circular metal insert 13 molded in situ therein and strongly bonded to the rubber by vulcanization in situ. Metal insert 13 has a slot 14 therein for receiving one end of the connecting rod 15 (see Fig. 2) and a transverse hole 16 for receiving the pivot pin 17 by means of which connecting rod 15 is suitably pivoted to the rear end of the piston of Fig. 1. Thus the metal insert 13 provides a non-breakable and non-distortable reinforcement for the rubber portions of the piston and at the same time provides a suitable metallic bearing for the pivot connection to the connecting rod 15. Insert 13 is preferably of cold rolled steel and machined to the desired dimensions before being located as an insert in the cavity of the vulcanizing mold. The uncured rubber blanks to form the rubber portions 10 and 11 are separately compounded so as to produce the desired hard and soft rubber respectively when cured simultaneously in the vulcanizing mold, and these two rubber portions will of course be integrally bonded together during the vulcanization. There will be no sharp line of division between the hard and soft rubber portions 10 and 11 since the greater percentage of sulphur and accelerator in the blank for portion 10 will have some vulcanizing effect on the adjacent portions of the blank for portion 11 during vulcanization. Preferably the rubber at the lips of the cup 11 is the softest and its hardness increases gradually to a point adjacent the closest end of the metal insert 13. The line 20 in Fig. 1 indicates the line of division between the two uncured blanks prior to vulcanization.

A series of grooves 25 are molded in the surface of the hard rubber body 10 to provide for easier return of the fluid from the back end to the front end of the piston during the rearward movement thereof. These grooves 25 taper off to zero before they reach the lip of the flexible cup flange 12, as clearly shown in Fig. 1. Thus it will be seen that when the piston moves rearwardly the fluid in grooves 25 may pass easily to the front end of the piston by the inward flexure of the flexible flange 12, but upon forward movement of the piston this flexible flange 12 is expanded by the compressed fluid into sealing engagement with the cylinder walls and thus completely closes all the ducts 25. The expansible cup flange 12 thus serves as a simple one-way valve for all the ducts 25.

The hard rubber body 10 may have any desired amount of graphite compounded therein to provide a suitable anti-friction bearing surface which slides against the cylinder walls. In any case the friction and wear of the hard rubber body 10 against the cylinder walls will be smaller than a similar rubbing together of two metal surfaces.

While the embodiment of the present invention as herein disclosed, constitutes a preferred form, it is to be understood that other forms might be adopted, all coming within the scope of the claims which follow.

What is claimed is as follows:

1. A one-piece unitary piston for a hydraulic brake cylinder, comprising: an integrally molded flexible rubber piston head and hard rubber body, said hard rubber body having a metal insert vulcanized in situ therein and having a pivot attachment means for connection to a connecting rod.

2. A unitary piston for a hydraulic brake cylinder, comprising: a metal insert having a pivot attachment to a connecting rod, a hard rubber casing surrounding said metal insert and bonded thereto by vulcanization in situ and forming the bearing surface for contacting the cylinder walls, and a flexible rubber cup head integrally molded to said hard rubber casing.

3. A unitary piston for a hydraulic brake cylinder, comprising: a metal insert having a pivot attachment to a connecting rod, a hard rubber casing surrounding said metal insert and bonded thereto by vulcanization in situ and forming the bearing surface for contacting the cylinder walls, said rubber casing having a longitudinally extending groove formed in its surface and providing a duct from the pivot end to the head end of the piston, and a flexible rubber cup head integrally molded to said hard rubber casing.

4. A one-piece unitary piston for a hydraulic brake cylinder, comprising: an integrally molded flexible rubber piston head and hard rubber body, said hard rubber body having a metal insert vulcanized in situ therein and having a pivot attachment means for connection to a connecting rod, said hard rubber body having a duct groove formed in its surface and leading from the pivot end to the flexible rubber head, said flexible rubber head forming a closure for said duct when it is expanded by fluid pressure.

5. A one-piece unitary piston for a hydraulic brake cylinder, comprising: an integrally molded flexible rubber piston head and hard rubber body, said hard rubber body having a metal insert vulcanized in situ therein and having a pivot attachment means for connection to a connecting rod, said piston having a fluid-conveying duct leading from the pivot end to a point adjacent the flexible rubber head, said flexible rubber head forming a closure for said duct when it is expanded by fluid pressure acting upon the head.

HARVEY D. GEYER.